Patented Nov. 10, 1925.

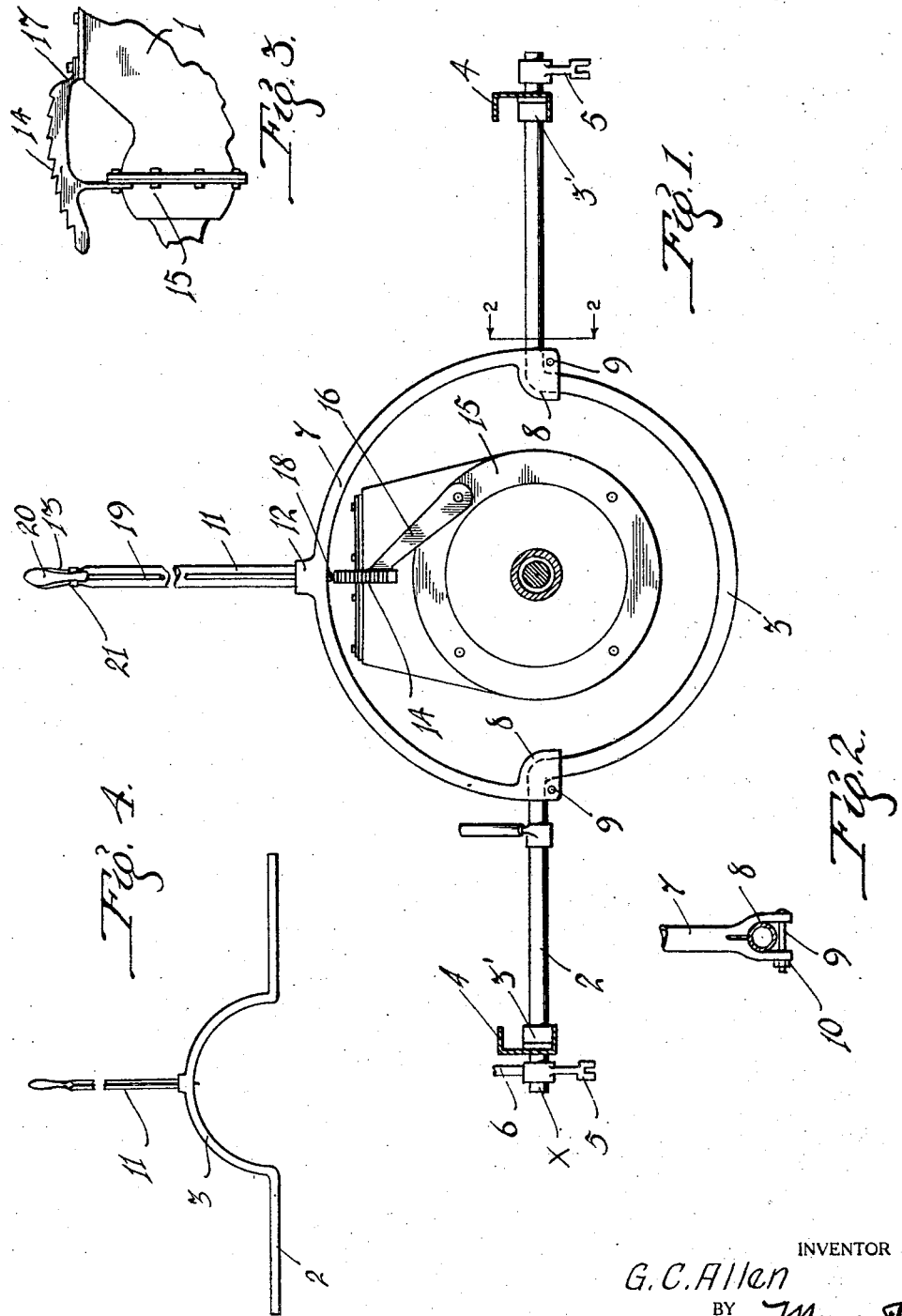

1,560,636

UNITED STATES PATENT OFFICE.

GROVER CLEAVLAND ALLEN, OF JOPLIN, MISSOURI, ASSIGNOR OF ONE-FOURTH TO MENZO PLATNER AND ONE-FOURTH TO RUSSELL L. RICE, BOTH OF JOPLIN, MISSOURI.

CENTER EMERGENCY BRAKE AND CONTROL LEVER FOR MOTOR VEHICLES.

Application filed September 29, 1924. Serial No. 740,633.

*To all whom it may concern:*

Be it known that I, GROVER C. ALLEN, a citizen of the United States, and a resident of Joplin, in the county of Jasper and State of Missouri, have invented a new and useful Improvement in Center Emergency Brakes and Control Levers for Motor Vehicles, of which the following is a full, clear, and exact description.

My invention relates to improvements in center emergency brakes and control levers for motor vehicles of the type employing a planetary transmission and foot pedals for actuating the speed control of the vehicle. The emergency lever is intended to replace the one provided in the standard make of vehicle which is disposed at the left side of the steering column and at the left end of the emergency brake shaft.

An object of my invention is to provide an emergency brake and control lever of the character described which is so disposed upon the brake lever shaft as to equalize the pull upon the brake bands on the rear wheels of the vehicle, whereas in the standard construction the pull upon the brake band at the left is necessarily greater than that upon the brake band at the right wheel.

A further object of my invention is to provide an emergency brake and control lever of the character described which may be quickly and easily attached to the standard type of motor vehicle without the use of special tools and without in any way reconstructing any of the standard parts.

A further object of my invention is to provide an emergency brake and control lever of the character described in which nothing but the top portion of the lever extends above the floorboard of the vehicle, thereby presenting a neat and unobtrusive appearance.

A further object of my invention is to provide an emergency brake and control lever of the character described in which manufacturing cost is reduced to a minimum due to the small number of parts employed and the simplicity of the construction.

Other objects and advantages will appear in the following specification, and the novel features of the invention will be particularly pointed out in the appended claims.

My invention is illustrated in the accompanying drawings forming a part of this invention, in which:

Figure 1 is an elevation of an embodiment of my invention as applied to the standard type of motor vehicle emergency brake shaft, Figure 2 is a sectional view along the line 2—2 of Figure 1, Figure 3 is a fragmentary side elevation of a portion of the mechanism shown in Figure 1, and Figure 4 is a view of a modified form of emergency brake shaft which may be employed in carrying out my invention.

In carrying out my invention I make use of the ordinary type of motor vehicle employing a planetary transmission housed within a transmission housing 1. This motor vehicle is provided with an emergency brake shaft 2 mounted in bearings 3' disposed diametrically opposite one another upon the side frames 4 of the vehicle. The shaft 2 has a curved portion 3 at the central part thereof so as to clear the transmission housing 1 when the shaft is oscillated.

A pair of bifurcated members 5 are provided, one on each end of the shaft 2, to which rods (not shown) are connected which in turn are connected with the standard type of brake band associated with each of the rear wheels of the vehicle. Oscillation of the shaft 2 causes similar oscillation of the bifurcated members 5 and consequent operation of the brake band.

In the standard type of construction an emergency lever and quadrant is employed and disposed at the end of the shaft 2, marked X. A portion of the standard lever is shown at 6. In carrying out my invention I cut off the old lever 6 and close up any hole or opening which may be left in the floorboard of the vehicle.

A semi-annular member 7 is provided having substantially the same radius as the curved portion 3 of the shaft 2. This semi-annular member 7 has pair of socket portions 8 (see Figure 2) at each end thereof which are arranged to partially encompass the shaft 2 and those portions of the shaft which merge with the cover portions 3. Bolts 9 are projected through the sockets 8 on the outer side of the shaft 2 and provided with nuts 10 which when turned cause the socket portion 8 to tightly grip the shaft so as to firmly fix the semi-annular member 7 upon the shaft.

A hand lever 11 is mounted at the crest of the semi-annular member 7, as shown at 12. The hand lever 12 has a handle portion 13 by means of which the lever may be manually grasped and oscillated, thereby causing oscillation of the shaft 2 for operation of the brake bands heretofore mentioned.

A ratchet toothed quadrant 14 is mounted upon the universal housing 15 by means of a depending arm 16, and to the transmission case cover bolt by means of a lug portion 17 carried thereby. This manner of fixing the quadrant 14 is clearly shown at 3.

A pawl 18 is carried by the lever 11 so as to engage with the ratchet toothed quadrant 14, and a rod 19 is provided parallel with the handle 11 and in close proximity therewith for lifting the pawl 18 out of engagement with the quadrant by means of a latch lever 20 pivotally mounted at 21 upon the handle portion 13 of the lever 11.

From the foregoing description of the various parts of the device the operation thereof may be readily understood. In the standard type of emergency brake control lever provided on motor vehicles of the character described the shaft 2 is oscillated for actuation of the brake bands by movement of the original lever, part of which is shown at 6. Inasmuch as this lever is disposed at the left hand of the shaft 2, great strain is brought to bear upon the brake band on the left rear wheel in order to procure adequate pressure in applying the brake band at the right rear wheel. This is due to the fact that the shaft 2 must necessarily twist slightly when the lever is drawn backwardly as in applying the brakes.

Furthermore, the disposition of the lever 6 in this position practically necessitates the use of the driver's left hand in stopping and starting the car, so that his right hand must be upon the wheel. The lever 6 as originally disposed upon the shaft 2 is also in the way of the driver's foot should he desire to rest his foot, while driving, to one side of the control pedals.

In operation, my improved lever operates by oscillation of the lever 11 rearwardly in applying the brakes, and forwardly to release the brakes. When the lever 11 is drawn backwardly, the pawl 18 will ride over the ratchet 14 until the hand is released from the handle portion 13, whereupon the pawl will engage with the quadrant to stay the return movement of the lever. Thus the brake bands at the left and right hand wheel are contracted. The contraction of the brake bands will be uniform, since any twisting which may occur on the shaft 2 will be identical as to each of the brake bands.

One of the important advantages of my improved construction is that the center control lever may be applied to the standard type of construction without the use of special tools and without reconstructing the vehicle in any way save for cutting off the old lever 6, which may be done with a hack saw in a few minutes time.

In Figure 4 I have shown a modified form of my invention in which I have replaced the shaft 2 with a shaft similar to the shaft 2 having the lever 11 mounted at the crest of the curved portion 3. In this installation the shaft 2 is disposed in the curved portion above the casing 1, in place of below the casing, as in the original construction.

The operation is identical to that shown in Figure 1.

I claim:

1. The combination with a motor vehicle having an emergency brake shaft, said emergency brake shaft having a portion intermediate its length formed substantially semi-annular and having substantially straight aligned portions at the opposite end, of a semi-annular member, sockets at each end of said semi-annular member arranged each to receive portions of said brake shaft including a portion of the semi-annular part and a portion of the straight part of the brake shaft, bolts projected through said sockets beyond that portion of the sockets occupied by the brake shaft, and a hand lever carried by said semi-annular member whereby actuation of the hand lever may cause positive movement of the brake shaft.

2. The combination with a motor vehicle having an emergency brake shaft, said emergency brake shaft having a portion intermediate its length formed substantially semi-annular and having substantially straight aligned portions at the opposite end, a transmission casing, of a semi-annular member, sockets at each end of said semi-annular member arranged each to receive portions of said brake shaft including a portion of the semi-annular part and a portion of the straight part of the brake shaft, bolts projected through said sockets beyond that portion of the sockets occupied by the brake shaft, a hand lever carried by said semi-annular member whereby actuation of the hand lever may cause positive movement of the brake shaft, and a quadrant for said lever mounted upon said transmission casing.

GROVER CLEAVLAND ALLEN.